(12) United States Patent
Fasciano

(10) Patent No.: US 7,529,155 B2
(45) Date of Patent: May 5, 2009

(54) WRISTWATCH WITH EARPHONE FUNCTION

(75) Inventor: Giovanni Fasciano, Lugaro (IT)

(73) Assignee: Global Watch Industries Srl, Modugno (BA) (IT)

( * ) Notice: Subject to any disclaimer, the term of this patent is extended or adjusted under 35 U.S.C. 154(b) by 0 days.

(21) Appl. No.: 11/813,163

(22) PCT Filed: Jan. 4, 2005

(86) PCT No.: PCT/IT2005/000001

§ 371 (c)(1),
(2), (4) Date: Jun. 29, 2007

(87) PCT Pub. No.: WO2006/072968

PCT Pub. Date: Jul. 13, 2006

(65) Prior Publication Data

US 2008/0043575 A1    Feb. 21, 2008

(51) Int. Cl.
   G04B 47/00    (2006.01)
   G04B 37/00    (2006.01)
(52) U.S. Cl. ............................ 368/10; 368/13; 368/277
(58) Field of Classification Search .................. 368/10, 368/13, 276–278
   See application file for complete search history.

(56) References Cited

U.S. PATENT DOCUMENTS

| | | | |
|---|---|---|---|
| D240,026 S | 5/1976 | Szalek | |
| D261,113 S | 10/1981 | Fukumura | |
| D274,410 S | 6/1984 | Suzuki | |
| D289,018 S | 3/1987 | Williams | |
| 4,821,247 A * | 4/1989 | Grooms | 368/63 |
| 5,008,864 A * | 4/1991 | Yoshitake | 368/10 |
| 5,274,613 A | 12/1993 | Seager | |
| D351,799 S | 10/1994 | Bulgari | |
| 5,467,324 A * | 11/1995 | Houlihan | 368/10 |
| D380,476 S * | 7/1997 | Zochert et al. | D14/249 |
| 5,659,611 A | 8/1997 | Saksa et al. | |
| D404,316 S | 1/1999 | Azegami et al. | |
| D404,654 S | 1/1999 | Kume et al. | |
| D409,999 S | 5/1999 | Nuovo et al. | |
| 6,008,720 A * | 12/1999 | Hongu et al. | 340/309.16 |
| D429,468 S | 8/2000 | Nakai et al. | |
| 6,212,414 B1 * | 4/2001 | Alameh et al. | 455/575.6 |
| D452,006 S | 12/2001 | Komulainen | |
| D454,551 S | 3/2002 | Bonadei et al. | |
| 6,459,890 B1 | 10/2002 | Kim | |
| 6,529,713 B1 * | 3/2003 | Seymour | 455/575.2 |
| D474,700 S | 5/2003 | Court | |
| D488,391 S | 4/2004 | Kume | |
| D489,346 S | 5/2004 | Lowinger | |

(Continued)

FOREIGN PATENT DOCUMENTS

EP    1154583 A    11/2001

(Continued)

*Primary Examiner*—Vit W Miska
*Assistant Examiner*—Sean Kayes
(74) *Attorney, Agent, or Firm*—Panitch Schwarze Belisario & Nadel LLP

(57) ABSTRACT

A wristwatch comprising a main unit associated in removable manner with a seating prepared on a support and/or positioning element, which is in turn associated with an attachment element to attach it to the user's wrist. The main unit incorporates both the normal functions of a watch and also the function of an earphone.

11 Claims, 3 Drawing Sheets

U.S. PATENT DOCUMENTS

| | | |
|---|---|---|
| 6,757,390 B2 * | 6/2004 | Ito et al. ................... 379/433.1 |
| 6,775,205 B1 * | 8/2004 | Sporn .......................... 368/10 |
| D496,590 S | 9/2004 | Chung et al. |
| 6,795,718 B2 | 9/2004 | Bae |
| D509,210 S | 9/2005 | Skulley et al. |
| 6,961,286 B1 * | 11/2005 | Alagia ......................... 368/10 |
| D519,855 S | 5/2006 | Tonohori |
| D527,281 S | 8/2006 | Kojima et al. |
| D536,267 S | 2/2007 | Vigil et al. |
| D540,695 S | 4/2007 | Leung |
| D540,697 S | 4/2007 | Kojima |
| D545,813 S | 7/2007 | Ma |
| D550,101 S | 9/2007 | Umebayashi et al. |
| 2001/0004397 A1 * | 6/2001 | Kita et al. ................... 381/334 |
| 2001/0009533 A1 | 7/2001 | Baroche |
| 2002/0103014 A1 | 8/2002 | Hutchinson et al. |
| 2004/0057578 A1 | 3/2004 | Brewer |

FOREIGN PATENT DOCUMENTS

| | | |
|---|---|---|
| WO | 2004/006548 A | 1/2004 |

* cited by examiner

WRISTWATCH WITH EARPHONE FUNCTION

CROSS-REFERENCE TO RELATED APPLICATIONS

This application is a Section 371 of International Application No. PCT/IT2005/000001, filed Jan. 4, 2007, which was published in the English language on Jul. 13, 2006, under International Publication No. 2006/072968, the disclosure of which is incorporated herein by reference.

BACKGROUND OF THE INVENTION

The present invention concerns a wristwatch comprising a main unit that incorporates both the usual wristwatch functions and also an earphone function. The main unit is selectively removable from a support element that clamps it to the user's wrist, such a strap, belt, band or other similar or comparable element.

The strap or other similar element includes, or is associated with, a positioning element for the main unit, which defines a housing seating that contains the main unit so that it forms a line of continuity and bulk with the strap, at the same time protecting at least some of the operating elements of the earphone from scratches, knocks, dust or other degrading external agent.

The earphone may preferably embody also a microphone function so as to be usable as a mobile phone unit with the Bluetooth® technology or other technologies like Wi-Fi® or similar.

The ever wider and more general spread of cell phones, and the extensive technological development in the field of mobile communications, have gradually led the producer Companies in this field to elaborate technical solutions intended to facilitate more and more the use and availability of telephonic instruments substantially under all conditions of use, and providing them with ever more evolved functions.

To allow the use of the cell phone also in particular conditions, for example when the user is driving, writing or in any case in situations when the hands are occupied, the use of earphones has been developed, first of the type with a wire, and more recently of the type without any connection to the relative cell phone.

This last technology is commonly known as Bluetooth®, from the name of the most widespread protocol of wireless communication between the cell phone and the earphone, or micro-telephone.

Although in the following description we shall refer mainly to the Bluetooth® technology, the invention is also applied when other communication protocols are used, for example the Wi-Fi® protocol, or any other with the same characteristics.

To perform these functions, micro-telephone apparatuses have therefore been made, which incorporate both a receiver unit, or speaker, and also a transmitter unit, or microphone; said micro-apparatuses have an ergonomic form suitable to allow them to be fixed to the user's ear and allow him to carry out a telephone communication without requiring any other support for the apparatus.

The laws that forbid the use of cell phones when driving have led to a further stimulus to the development and diffusion of this technology.

However, it may be a disadvantage for users to have to transport and keep, in a sufficiently safe and protected place, objects such as earphones of the type described above, which are rather small and also very delicate since they are easily subject to damage and malfunctions if they are knocked, or in the event of infiltrations of dust, water or other external agent.

If carried in the pocket, they can easily fall or be crushed, and in any case they are not protected from dust or suchlike.

If they are concealed in places that are protected but difficult to get at, they may not be readily available in the case of need, for example when a phone call arrives when the user is driving.

Various solutions have therefore been proposed in which the earphone has been associated with other portable apparatuses from which it can be detached to be available for use.

However, known solutions have shown themselves to be not very effective since either they do not guarantee to protect the earphone sufficiently from knocks and external agents, or they entail substantial modifications to the shape, and hence to the portability and external appearance, of the portable apparatus or object with which they are associated; or they do not allow the earphone to be easily and quickly removed for use, and/or to be clamped securely and safely when it is not in use.

The purpose of the present invention is therefore to overcome the disadvantages mentioned above, by achieving a solution which allows an earphone using the Bluetooth® technology to be transported comfortably and easily, in a protected condition, by associating it with a wristwatch, without this association entailing any modification to the usability and portability of the wristwatch, but on the contrary providing it with a particularly effective and attractive ergonomic shape.

The Applicant has devised, tested and embodied the present invention to overcome the shortcomings of the state of the art and to obtain these and other purposes and advantages.

BRIEF SUMMARY OF THE INVENTION

The present invention is set forth and characterized in the main claim, while the dependent claims describe other characteristics of the invention or variants to the main inventive idea.

In accordance with the aforesaid purpose, the present invention is achieved in a wristwatch comprising a main unit able to be associated, in a selectively removable manner, with a seating suitably prepared on a support element, which is in turn associated with an element attaching it to the user's wrist, such as a strap, a belt, a band or other similar or comparable element.

According to the invention, the main unit incorporates both the normal watch functions, with a display dial, means to adjust the time, possibly a calendar and a chronometer, and other possible functions connected to the watch function, and also the earphone function.

With the term earphone function we mean that the main unit embodies at least the receiver unit of a phone apparatus, but it is clear that the main unit may also embody integrally also the transmitter unit, such a microphone, so as to be usable like a small hand-free headset.

In order to perform the earphone function, the main unit incorporates reception means, for example at least a speaker associated with a relative electronic circuit housed inside the main unit, and at least a microphone, also associated with a relative electronic circuit housed inside the main unit.

According to the invention, the main unit has an ergonomic shape so that, when it is removed from the relative seating and detached from the strap, or other element of the wristwatch, it can be hung from the ear, with the microphone located in substantial proximity or in any case near to the user's mouth.

The seating for the main unit provided in the wristwatch is shaped so that when the main unit is arranged and assembled inside it, when it is not used in the earphone function it has a continuity of line and bulk with the strap and with the seating itself, also arranging the components of the watch function in a position immediately available for use and ensuring an optimum portability and appearance of the watch.

In a preferential embodiment of the invention, on the perimeter the main unit has snap-in anchoring elements, able to cooperate with mating holding elements present on the perimeter of the seating, in order to guarantee a safe and secure positioning when in the assembled position for the watch function, and at the same time a quick and easy removal at the moment of use.

According to the invention, when assembled in the relative seating, the exposed elements of the earphone function, for example the microphone and the speaker, are advantageously arranged in a position that is protected and secure from knocks and infiltrations of dust or other atmospheric agents, so as to preserve their integrity in all the phases of non-use.

In a preferential embodiment of the invention, the speaker element can be selectively removed with respect to a relative side, or inner side, of the main unit, in order to be compressed substantially in a retracted position against said side when the main unit is assembled in the relative seating, and, on the contrary, extracted outside the relative side of the main unit when it is removed from the seating and used as an earphone.

In another preferential embodiment, the main unit has, advantageously on the sides, gripping means of the ergonomic type, by means of which it can be handled easily by the user, for example in order to be removed from or replaced into the relative seating.

With the present invention we therefore obtain a particularly effective solution to allow an earphone using the Bluetooth® technology to be transported, preserved and easily retrieved, in an ergonomic solution, of a particularly attractive external appearance and guaranteeing an effective conservation of the relative electronic components from every possible contamination or deterioration caused by external agents.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

These and other characteristics of the present invention will become apparent from the following description of a preferential form of embodiment, given as a non-restrictive example with reference to the attached drawings wherein.

DETAILED DESCRIPTION OF THE INVENTION

Figure 1:
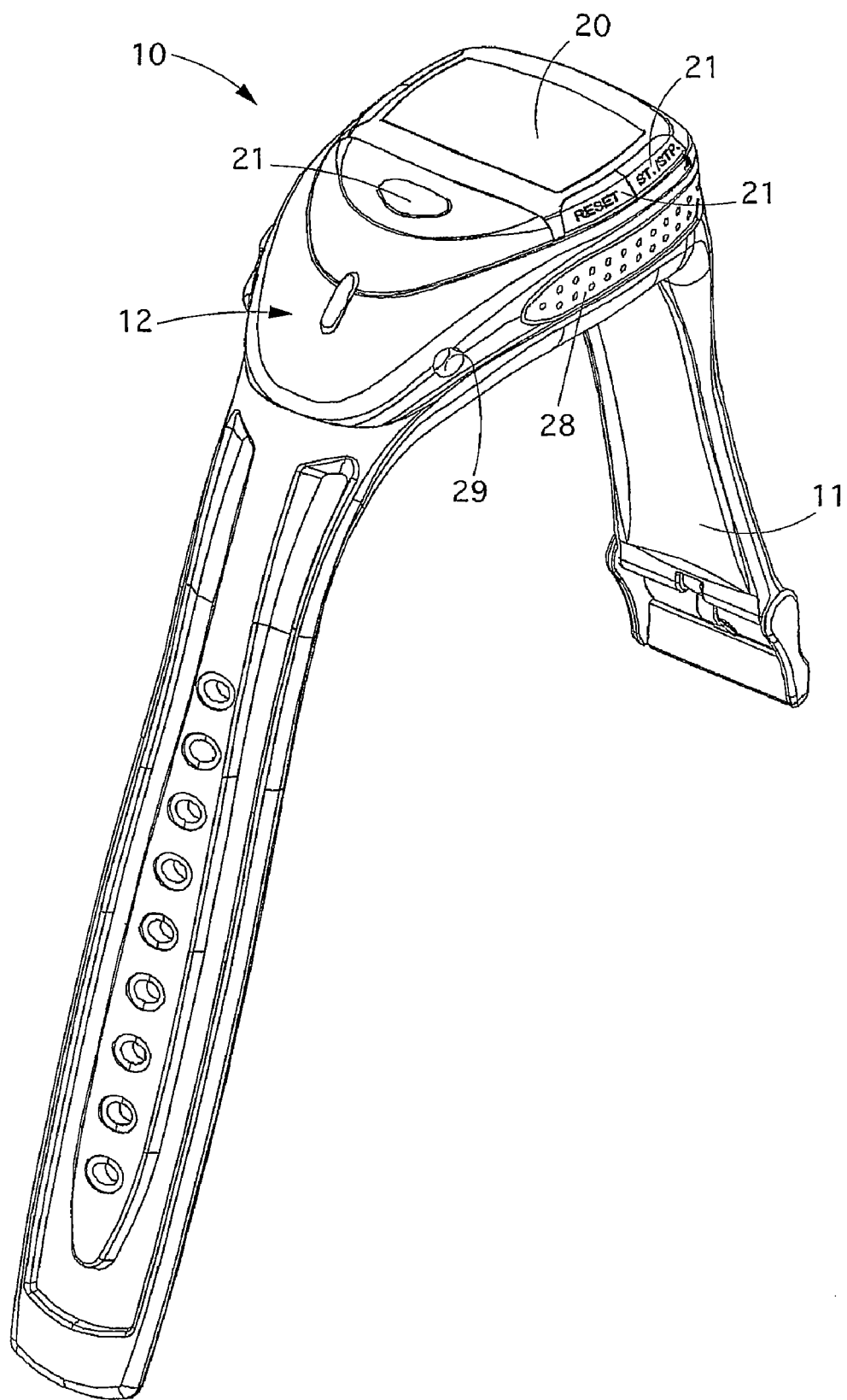
FIG. 1 is a perspective view of a wristwatch in accordance with the present invention.

With reference to FIG. 1, a wristwatch 10 with an earphone function according to the present invention comprises a strap 11 suitable to be attached to the wrist of a user, and a main unit 12.

The main unit 12, as will be described in more detail hereafter, is suitable to support both the necessary and/or auxiliary components for performing the watch function, and also the components necessary for performing the function of earphone according to the Bluetooth® technology.

By necessary and/or auxiliary components we mean both external components that interface with the user, such as dials, displays, adjustment means, command means and function selection means, microphone, speaker, etc., and also internal components necessary for functioning, such as a microprocessor, one or more electronic circuits, connection and interface cards, feeders, etc.

Figure 2:
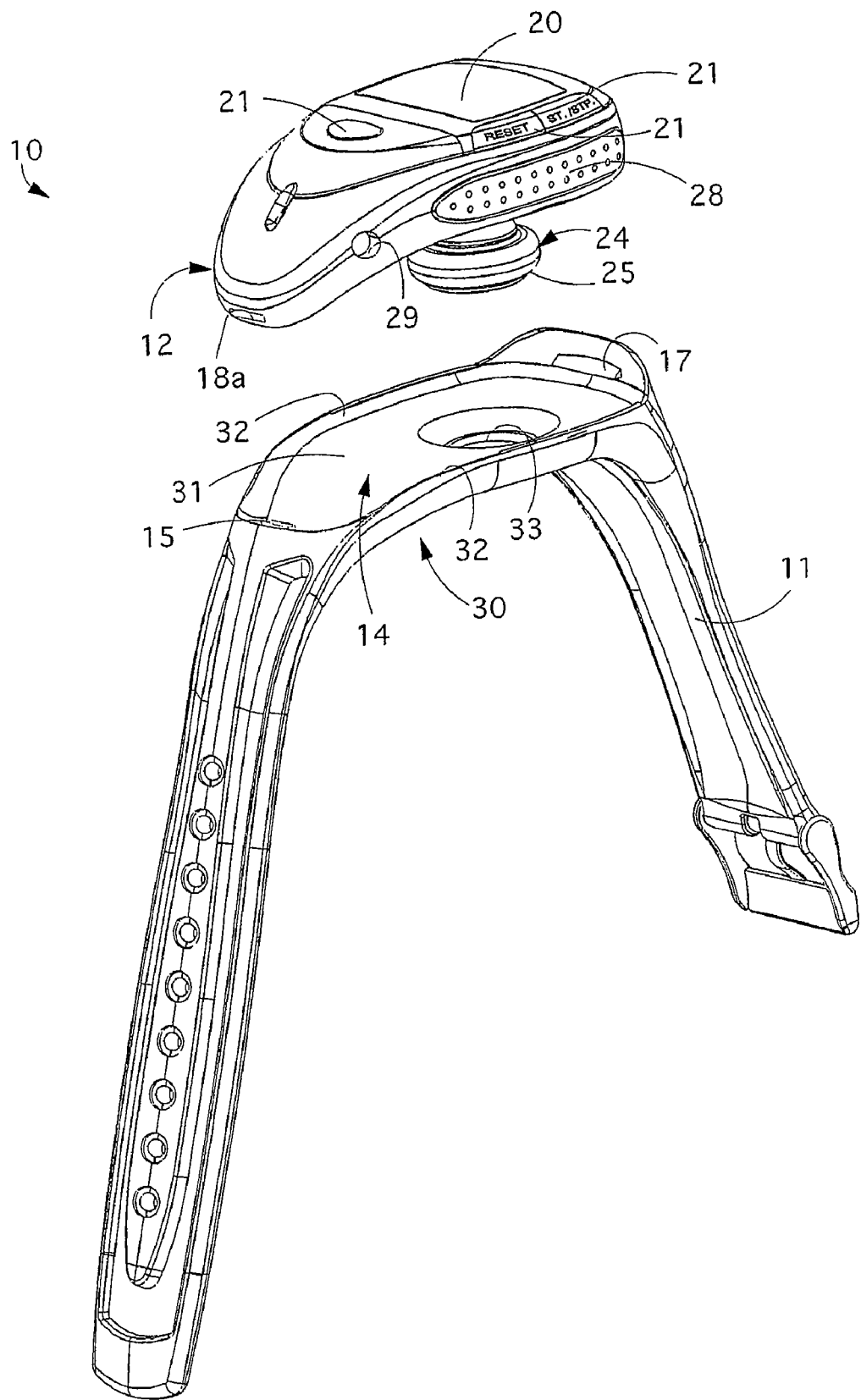
FIG. 2 is an exploded perspective view of the wristwatch in FIG. 1.

The strap 11, in this case made in a single piece, has a positioning element 30 defining on its upper side a shaped seating 14 (FIG. 2) with respect to which the main unit 12 can be selectively assembled and dis-assembled. It comes within the scope of the invention that the strap 11 is distinct from the positioning element 30 and is attached thereto with normal connection means.

It also comes within the scope of the invention that, instead of the strap 11, any other attachment element can be used, for example a belt, a band or other similar or comparable element.

The shaped seating 14 has a substantially flat bottom 31 and, on the sides, raised containing ridges 32. On the bottom 31 there is a flared hole 33, in this case through, the function of which will be explained hereafter.

On the front side of the shaped seating 14 there is an attachment tooth 15 while on the rear side of the shaped seating 14 there is an elastic holding fin 17. Said attachment tooth 15 and said elastic fin 17 cooperate with respective eyelets 18a and 18b (FIG. 3a) made at the respective ends, front and rear, of the main unit 12.

Using the attachment tooth 15 and elastic fin 17, the main unit 12 can be easily and quickly assembled or removed into/from the shaped seating 14, at the same time ensuring a stable and secure attachment of the main unit 12 in the assembled position.

When the main unit 12 is inserted in the shaped seating 14, it constitutes a single body with the strap 11 and with the positioning element 30, and achieves a continuity of line and of bulk therewith, guaranteeing the whole an attractive appearance which furthermore in no way conditions the portability of the wristwatch and the availability of all its functions.

To facilitate handling, the main unit 12 comprises at the sides two gripping elements 28 of the ergonomic type, for example made of rubber or similar elastic material, advantageously knurled or dimpled on the outside, which facilitate, for example, the operations to remove and/or reposition the main unit 12 from/into the shaped seating 14.

The main unit 12, on its outer side, comprises a display 20 (FIGS. 1 and 2), in this case digital, for the watch function, that is, to display the time, day, etc.

It comes within the scope of the invention to use a watch with functions of the analog type instead of digital as shown here, which therefore does not use a display 20 but a normal dial with hands and possible display windows.

At the sides of the display 20 there are also, in this case, buttons 21 to control and adjust the functions of the watch.

Figure 3A:
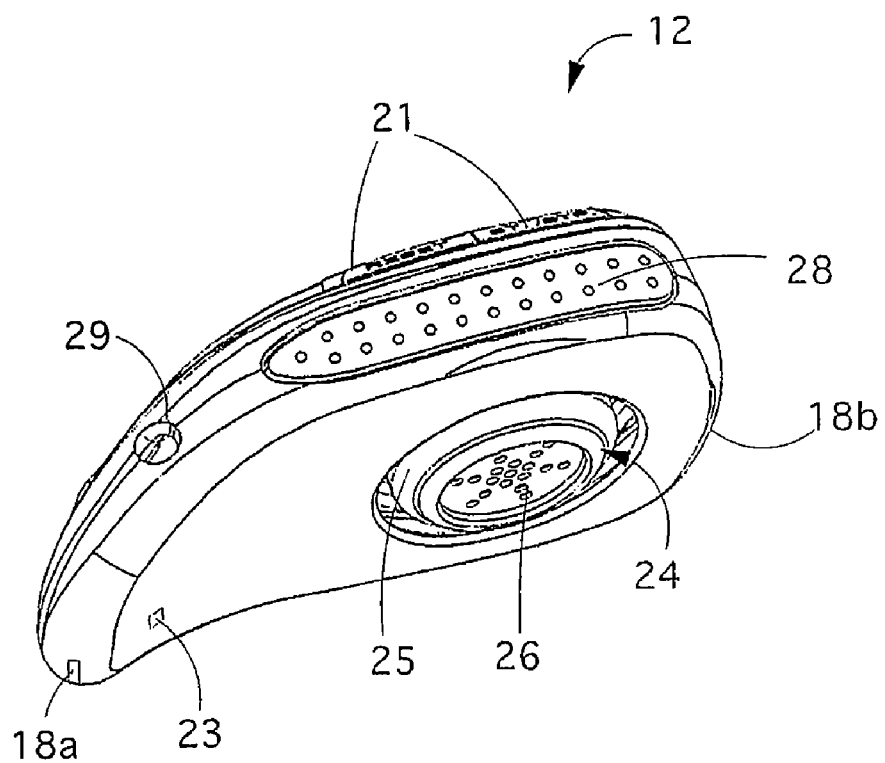
FIG. 3a is a view of a detail of FIG. 1.
Figure 3B:
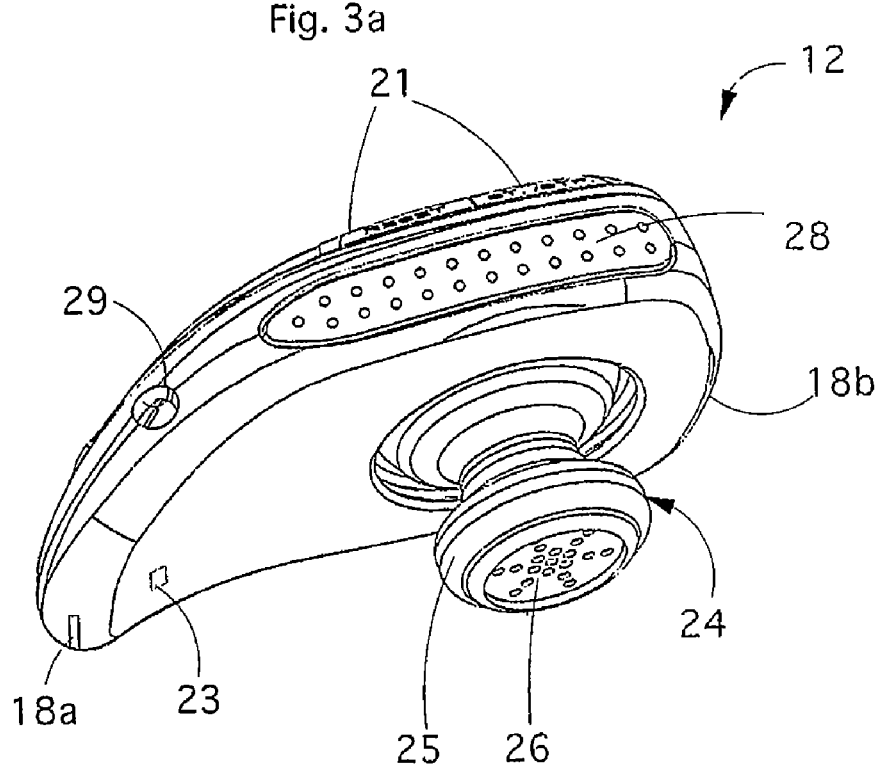
FIG. 3b is a view of a detail of FIG. 2.

The main unit 12 also incorporates a microphone 23 and an earphone element 24, in this case of the retractable type (FIGS. 3a, 3b).

The earphone element 24 is circular in section and on its lateral surface a ring 25 is arranged, made of rubber or similar elastomer material, suitable to be inserted into the user's ear; the earphone element 24 also incorporates a speaker 26.

When the main unit 12 is housed and assembled in the shaped seating 14, the earphone element 24 is compressed substantially inside the bulk of the body of the main unit 12; the part that protrudes is housed in the flared hole 33 provided on the bottom 31 of the shaped seating 14.

In this position, both the earphone element 24 and the microphone 23 are in a position protected from mechanical damage, such as knocks, scratches or suchlike, and also from possible infiltrations of external agents, such as dust, water or other liquids.

When the main unit 12 is removed from the shaped seating 14, the earphone element 24 is removed from the body of the main unit 12 in order to be inserted into the user's ear, so that the main unit 12 can perform its function as earphone.

When the earphone element 24 is inserted in the user's ear, the microphone 23 is arranged in proximity with the user's mouth.

The display 20 and the other electronic components of the wristwatch 10 are fed by a battery, not shown and contained inside the main unit 12. The battery is advantageously rechargeable, and to this end on a lateral edge of the body of the main unit 12 a hole 29 is provided for a feed connector.

The main unit 12 also houses inside itself all the other electric or electronic components needed to perform the function of earphone, which are in themselves substantially known and are not therefore described in detail here.

These components serve to establish communication, without connection and hence without wires, between the main unit 12 when it is configured in its earphone function, and a cell phone or other electronic communication device of a similar or comparable type.

In the preferential embodiment, there is a button on the main unit 12 that allows the selective configuration for the earphone function, for example using Bluetooth® technology, and also, advantageously, a button for answering a possible incoming telephone call.

It is clear that modifications and/or additions of parts may be made to the wristwatch 10 with earphone function as described heretofore, without departing from the scope of the present invention.

For example, it may be provided that the main unit 12, in the earphone function, can communicate with other electronic devices too, such as a portable electronic calculator, a palm PC, or other similar devices. It may also be provided that the display 20 of the main unit 12, apart from the functions relating to the watch function, can also display functions relating to the earphone function, such as the state of activity of the transmission/reception, the charge of the battery, the name and/or number of the caller, the amount of credit available, the duration of calls, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A wristwatch comprising a main unit able to be associated in a removable manner with a seating on a support and/or positioning element, which is in turn associated with an attachment element to attach said wristwatch to a user's wrist, wherein said main unit incorporates both the normal functions of a watch and also the function of an earphone, and wherein said main unit comprises hanging means for hanging the main unit from an ear of the user when removed from said seating and functions as a hand-free earphone.

2. A wristwatch as in claim 1, wherein said main unit comprises reception means, and wherein said hanging means for hanging the main unit from the ear of the user includes said reception means, which are associated with an electronic circuit housed inside of said main unit, and said main unit further comprising at least a microphone, also associated with an electronic circuit housed inside of said main unit.

3. A wristwatch as in claim 2, wherein said main unit has an ergonomic shape such that, when removed from said seating and detached from said attachment element and/or said positioning element, said main unit is able to be attached to the face of the user by hanging said reception means from the ear, said microphone being located in a position of proximity to the user's mouth in order to allow use of the main unit as the hand-free earphone.

4. A wristwatch as in claim 2, wherein said reception means comprise a speaker element able to be selectively removed with respect to a side of said main unit, to be compressed substantially in a retracted position against said side when said main unit is assembled in said seating, and to be extracted outside of the side of said main unit when said main unit is removed from said seating.

5. A wristwatch as in claim 1, wherein said seating for said main unit has a shape such that, when said main unit is arranged and assembled with said seating, said main unit has a continuity of line and bulk with said attachment element and/or with the positioning element and with said seating, also arranging the components of the watch function in a position immediately available for use and ensuring an optimum portability and appearance of the watch.

6. A wristwatch as in claim 5, wherein said seating has a substantially flat bottom and, on the sides, raised containing ridges for said main unit.

7. A wristwatch as in claim 1, wherein, on the perimeter, said main unit has snap-in anchoring elements able to cooperate with mating holding elements on the perimeter of said shaped seating.

8. A wristwatch as in claim 7, wherein on the front side of said seating there is an attachment tooth, while on the rear side of said seating there is an elastic holding fin, said attachment tooth and said elastic fin cooperating with respective eyelets made at the respective front and rear ends of said main unit.

9. A wristwatch as in claim 1, wherein said main unit has a perimeter which includes gripping means of the ergonomic type, by means of which said main unit is able to be easily handled by the user.

10. A wristwatch as in claim 1, wherein said main unit includes Bluetooth® technology in order to be used with a cell phone.

11. A wristwatch as in claim 1, wherein said main unit includes Wi-Fi® protocol in order to be used with a cell phone.

* * * * *

UNITED STATES PATENT AND TRADEMARK OFFICE
CERTIFICATE OF CORRECTION

PATENT NO. : 7,529,155 B2  Page 1 of 1
APPLICATION NO. : 11/813163
DATED : May 5, 2009
INVENTOR(S) : Giovani Fasciano It is certified that error appears in the above-identified patent and that said Letters Patent is hereby corrected as shown below:

Title Page, item (75):

Inventor information should read -- Giovani Fasciano, Lugano, Switzerland --.

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

PATENT NO.         : 7,529,155 B2
APPLICATION NO.    : 11/813163
DATED              : May 5, 2009
INVENTOR(S)        : Giovanni Fasciano Page 1 of 1

It is certified that error appears in the above-identified patent and that said Letters Patent is hereby corrected as shown below:

Title Page, item (75):

Inventor information should read -- Giovanni Fasciano, Lugano, Switzerland --.

This certificate supersedes the Certificate of Correction issued August 25, 2009.

Signed and Sealed this

Ninth Day of February, 2010

David J. Kappos
*Director of the United States Patent and Trademark Office*